(12) United States Patent
Koplow et al.

(10) Patent No.: US 6,496,301 B1
(45) Date of Patent: Dec. 17, 2002

(54) HELICAL FIBER AMPLIFIER

(75) Inventors: Jeffrey P. Koplow, Washington, DC (US); Dahv Kliner, San Ramon, CA (US); Lew Goldberg, Fairfax, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/523,215

(22) Filed: Mar. 10, 2000

(51) Int. Cl.⁷ .............................. G02B 6/120; H01S 3/07
(52) U.S. Cl. ................. 359/337; 359/337.1; 359/337.2; 359/341.1; 385/104
(58) Field of Search .................................. 357/337, 341, 357/885, 337.1, 337.2, 341.1; 385/1, 104

(56) References Cited

U.S. PATENT DOCUMENTS 4,765,704 A * 8/1988 Pers ............................ 359/885
4,943,157 A * 7/1990 Reading ........................ 354/4

FOREIGN PATENT DOCUMENTS

EP          442553     *   8/1991

OTHER PUBLICATIONS

Palai et al, Opt. Fiber Tech: Materials, Devices, & Systems, vol. 1, #4, pp 341–345; Abst. Only Herewith, Oct. 1995.*

Su et al, Optics Communications, vol. 114, No. 3–4, pp 255–261; Abstract Only Herewith, Feb. 1, 1995.*

Sharma et al, Optics Communications; vol. 111, No. 1–2, pp 127–131; Abst. Only Herewith, Sep. 15, 1994.*

Schwierz et al, Electronics Letters, vol. 23, # 24, pp 1296–8; Abst. Only Herewith, Nov. 19, 1987.*

* cited by examiner

Primary Examiner—Nelson Moskowitz
(74) Attorney, Agent, or Firm—John J. Karasek; Dorothy I. Becker

(57) ABSTRACT

A multi-mode gain fiber is provided which affords substantial improvements in the maximum pulse energy, peak power handling capabilities, average output power, and/or pumping efficiency of fiber amplifier and laser sources while maintaining good beam quality (comparable to that of a conventional single-mode fiber source). These benefits are realized by coiling the multimode gain fiber to induce significant bend loss for all but the lowest-order mode(s).

20 Claims, 9 Drawing Sheets

HELICAL FIBER AMPLIFIER

FIELD OF THE INVENTION

The present invention relates to fiber amplifiers, and more particularly, to a multimode fiber amplifier which discriminates against higher-order modes (e.g., discriminates against all but the fundamental mode).

RELATED ART

Single-mode (SM), rare-earth-doped fiber lasers and amplifiers are finding widespread use in applications requiring compact, rugged optical sources with diffraction-limited beam quality. The advent of double-clad fibers has allowed these sources to be scaled to average powers of >100 W. (See V. Dominic, S. MacCormack, R. Waarts, S. Sanders, S. Bicknese, R. Dohle, E. Wolak, P. S. Yeh, and E. Zucker, in *Conference on Lasers and Electro-Optics* (Optical Society of America, Washington D.C., 1999), paper CPD11). For applications requiring high-energy pulses, such as nonlinear frequency conversion (see J. P. Koplow, D. A. V. Kliner, and L. Goldberg, IEEE Photon. Technol. Lett. 10, 75 (1998)), pumping of optical parametric oscillators/amplifiers (see P. E. Britton, H. L. Offerhaus, D. J. Richardson, P. G. R. Smith, G. W. Ross, and D. C. Hanna, Opt. Lett. 24, 975 (1999)), lidar, and materials processing, the use of fiber-based systems has been limited by the relatively low pulse energies available compared to bulk lasers. Similarly, for continuous-wave (cw) applications requiring narrow linewidth, fiber sources are restricted to relatively low power.

These limitations arise from two factors: low energy storage and the onset of nonlinear processes in the fiber. The maximum pulse energy that can be attained with a fiber amplifier (i.e., the amount of energy that can be stored in the gain medium) is limited by amplified spontaneous emission (ASE). The peak- and average-power-handling capability of fiber sources is determined by the onset of nonlinear processes that occur inside the fiber. Both of these limitations are briefly reviewed here.

Energy Storage: The primary loss processes for energy deposited into the gain medium are spontaneous emission (fluorescence) and amplified spontaneous emission. The vast majority of spontaneous emission, which is emitted equally in all directions, escapes out the side of the fiber. However, a small fraction of this light is captured in the core and amplified as it propagates down the length of the fiber (ASE). When the population inversion in the gain medium is relatively low (i.e., at low pump power), spontaneous emission is the dominant loss process. In this low power limit the stored energy increases linearly with pump power. At sufficiently high pump power, the gain in the fiber becomes large enough that the power lost to ASE is comparable to the power lost to spontaneous emission. As ASE starts to take over as the dominant loss process, the stored energy as a function of pump power begins to level off. Eventually, a high power limit is reached in which the stored energy increases logarithmically (rather than linearly) with pump power. For this reason the maximum amount of energy that can be stored in the gain medium is determined by ASE.

Nonlinear Processes: Nonlinear processes that occur at high optical intensities impose an upper limit on the amount of power that can be transmitted through a given length of fiber. The most important of these nonlinear processes are stimulated Brillioun scattering (SBS), stimulated Raman scattering (SRS), and self-phase modulation (SPM). (See *Nonlinear Fiber Optics*, G. P. Agrawal, Academic Press, San Diego, Calif, 1995.) These processes are characterized by a threshold power, above which a significant portion of the energy in a high-power pulse is converted to different (unwanted) wavelengths. The relative importance of these processes depends on pulse duration and spectral bandwidth.

Two approaches to overcoming these limitations have been reported. Taverner et al. developed large-mode-area, Er-doped SM fibers with numerical aperatures (NA) of 0.066 to 0.08 and core diameters of 14 to 17 $\mu$m. (See D. Taverner, D. J. Richardson, L. Dong, J. E. Caplen, K. Williams, and R. V. Penty, Opt. Lett. 22, 378 (1997); G. P. Lees, D. Taverner, D. J. Richardson, L. Dong, and T. P. Newson, Electron. Lett. 33, 393 (1997)) Decreasing the NA (relative to standard telecommunication values of ~0.15) allows the core size to be increased while maintaining SM operation. The resultant increased mode-field area raises the threshold for nonlinear processes. In addition, the lower NA reduces the fraction of spontaneous emission captured by the fiber, thereby increasing energy storage. (See J. Nilsson, R. Paschotta, J. E. Caplen, and D. C. Hanna, Opt. Lett. 22, 1092 (1997)) Several groups have used multimode fiber amplifiers and have obtained varying levels of suppression of high-order modes by adjusting the fiber index and dopant distributions (See H. L. Offerhaus, N. G. Broderick, D. J. Richardson, R. Sammut, J. Caplen, and L. Dong, Opt. Lett. 23, 1683 (1998); J. M. Sousa and O. G. Okhotnikov, Appl. Phys. Lett. 74, 1528 (1999)), cavity configurations (See U. Griebner, R. Koch, H. Schonnagel, and R. Grunwald, Opt. Lett. 21, 266 (1996); U. Griebner and H. Schonnagel, Opt. Lett. 24, 750 (1999)), and/or launch conditions of the seed beam. (See O. G. Okhotnikov and J. M. Sousa, Electron. Lett. 35, 1011 (1999); C. C. Renaud, R. J. Selvas-Aguilar, J. Nilsson, P. W. Turner, and A. B. Grudinin, IEEE Photon. Technol. Lett. 11, 976 (1999); M. E. Fermann, Opt. Lett. 23, 52 (1998); M. Hofer, M. E. Fermann, A. Galvanauskas, D. Harter, and R. S. Windeler, IEEE Photon. Technol. Lett. 11, 650 (1999); I. Zawischa, K. Plamann, C. Fallnich, H. Welling, H. Zellmer, and A. Tünnermann, Opt. Lett. 24, 469 (1999).)

SUMMARY OF THE INVENTION

An object of the present invention is to provide a multimode fiber amplifier having maximum pulse energy, peak power, and average power capabilities greater than those of conventional single-mode fiber amplifiers while maintaining beam quality comparable to such single-mode fiber amplifiers.

It is a further object of the present invention to provide a fiber amplifier comprising a multimode fiber for supporting the fundamental mode ($LP_{01}$) while suppressing higher-order modes so as to produce an output beam having a beam quality that is diffraction-limited (or near diffraction-limited).

It is a further object of the invention to provide a multimode fiber amplifier that discriminates between the fundamental mode and higher-order modes, i.e., attenuates the latter to a significantly greater extent than the former.

It is a further object of the invention to provide a multimode fiber amplifier which discriminates comparably between the + and − helical polarities of the undesired higher-order modes.

These and other objects are achieved by the provision, in accordance with the present invention, of a multimode fiber amplifier configured to have a bend loss providing greater suppression of higher-order fiber modes than of a preselected fiber mode of lower-order than the higher-order fiber modes.

Preferably, the fiber amplifier comprises a multimode fiber that is coiled to achieve the aforementioned mode-filtering effect.

In accordance with a further aspect of the invention, there is provided the multimode fiber amplifier system providing discrimination between a fundamental mode and undesired higher-order modes, the amplifier system comprising: a light source for producing a light beam, and a multimode fiber amplifier for receiving said light beam and comprising a multimode optical fiber, capable of supporting a fundamental mode and higher-order modes, having a radius of curvature such that the higher-order modes experience substantially increased bend losses as compared with the fundamental mode.

Preferably, the fiber comprises a coiled fiber. The coiled fiber preferably has a constant radius of curvature but, in useful embodiments, the coiled fiber can have a non-constant radius of curvature.

In one preferred implementation, the light source comprises a continuous wave light source while, in another, the light source comprises a pulsed light source.

The multimode optical fiber preferably comprises a double-cladding structure. Advantageously, the multimode optical fiber comprises a core having a diameter of between 3 $\mu$m and 100 $\mu$m (although a core diameter in excess of 100 $\mu$m is also possible).

In an important implementation, the multimode optical fiber is coiled onto two mandrels, comparable in diameter, whose longitudinal axes are mutually perpendicular, where the length of fiber wound onto each mandrel is approximately equal.

The multimode fiber amplifier preferably has an $M^2$ value less than 1.2, where $M^2=1$ denotes diffraction-limited beam quality. In some applications, however, operation at an $M^2$ value greater than 1.2 may prove advantageous.

In accordance with a further aspect of the invention, a multimode fiber amplifier is provided which comprises: a cylindrical support member, and a multimode optical fiber having a core diameter such that the fiber is capable of supporting a fundamental mode and a plurality of higher-order modes, the fiber being wound onto the support member having a radius such that said higher-order modes experience substantially increased bend losses as compared with the fundamental mode.

As above, the coil of fiber preferably has a constant radius of curvature, although, in useful implementations the coil of fiber can have a non-constant radius of curvature.

Also as above, the multimode optical fiber beneficially comprises a double-cladding structure, and advantageously comprises a core having a diameter of between 3 $\mu$m and 100 $\mu$m (although a core diameter in excess of 100 $\mu$m is also possible).

In a beneficial implementation, the amplifier comprises a second cylindrical support member having a diameter equal to that of the first-mentioned cylindrical support member, the second support member having a longitudinal axis extending perpendicular to that of the first support member.

Further objects, features and advantages of the present invention will be set forth in, or apparent from, the detailed description of preferred embodiments thereof which follows.

DESCRIPTION OF THE PREFERRED EMBODIMENTS

Figure 1:
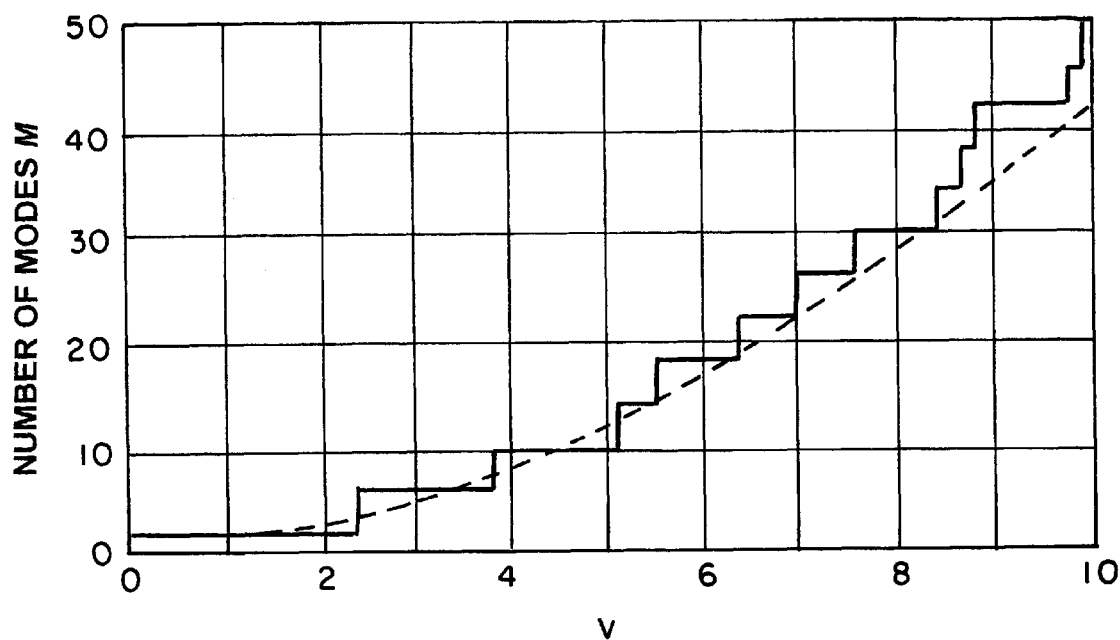
FIG. 1 is a graph plotting the total number of modes as a function of V (defined hereinbelow)

Before considering preferred embodiments of the invention, other aspects of the invention as well as other matters that impact on the invention will be considered. In the optimization of pulsed fiber amplifiers, three design parameters are available: rare-earth dopant concentration, fiber core size, and core/cladding index difference.

A detailed analysis reveals that the requirements for optimizing energy storage and peak power handling capability are:

1) as high a rare-earth dopant concentration as possible,
2) as low a core/cladding index difference (Δ) as possible, and
3) as large a core diameter ($d_{core}$) as possible.

A qualitative discussion of these results is given here.

The first item in the above list is straightforward. If the rare earth dopant level (and thus the gain per unit length) is made higher, the fiber amplifier can be fabricated from a shorter piece of fiber; the threshold power for the nonlinear effects under consideration is inversely proportional to fiber length. The small-signal gain and energy storage are not affected. There is a limit to how high we can make the dopant concentration in a practical fiber amplifier, however. Ion clustering and concentration quenching effects eventually cause steep reductions in quantum efficiency if the dopant concentration is made too high. (See *Rare Earth*

*Doped Fiber Lasers and Amplifiers*, edited by M. J. F. Digonnet, Marcel Dekker, Inc., New York, N.Y., 1993.) The maximum allowable dopant concentration depends on the rare-earth dopant ion and host glass composition and typically is in the range 0.1 to 2 weight percent.

The second item in the above list is more complicated. At given core size, when the core/cladding index difference is made smaller, two things happen: the NA of the fiber decreases and the mode-field diameter (MFD) of the fiber increases. The NA determines what fraction of spontaneous emission is captured in the core (and therefore contributes to ASE). The amount of spontaneous emission that is within the acceptance angle of the fiber is proportional to $\Delta$ (or equivalently, $NA^2$). Lowering $\Delta$ allows a larger population inversion to be established in the gain medium, resulting in an increase in stored energy and small-signal gain. The small-signal gain is also proportional to the overlap integral of the $LP_{01}$ mode field distribution and the core ($\gamma$), however. As $\Delta$ is made smaller, the MFD increases, and $\gamma$ is reduced. This serves to lower the small-signal gain and increase the amount of energy that can be stored, but is a relatively weak effect. Where consideration of the mode field diameter becomes important is in the area of nonlinear processes. The threshold power for SBS, SRS, and SPM scale as $MFD^2$.

Evidently, minimization of the core/cladding index difference is helpful in every respect: stored energy, threshold for nonlinear processes, and small-signal gain. Unfortunately, there are practical limitations to the extent to which the core/cladding index difference can be reduced. Variations in the index profile of commercially manufactured fibers make it difficult to achieve core/cladding index differences of less than $\Delta \approx 0.001$ ($NA \approx 0.06$).

If instead we increase $d_{core}$ while keeping $\Delta$ fixed, there is an increase in the MFD and an increase in the number of dopant atoms per unit length of fiber. An increase in MFD is beneficial for suppression of nonlinear processes and the larger number of dopant ions results in a corresponding increase in stored energy. The small-signal gain is not affected significantly by the change in core size, because to first order $\gamma$ is constant as a function of V for a multimode fiber.

The above discussion is roughly summarized in the following table:

| fiber amplifier design: | small diameter core, long length of fiber | large diameter core, short length of fiber |
| --- | --- | --- |
| energy storage: | poor | excellent |
| threshold for nonlinear processes: | poor | excellent |
| small-signal gain: | excellent | good |

Regarding the "poor" energy storage of the small core fiber amplifier, strictly speaking it is possible to increase the stored energy by fabricating a fiber with a very small core diameter. At very small V, $\gamma$ falls off rapidly, making it possible to sustain a larger population inversion. But if the small-signal gain is to be kept high enough for operation of a practical amplifier, the length of the fiber becomes prohibitive from the standpoint of nonlinear effects. Moreover, pumping an amplifier with a very small core presents a number of logistical problems that render such a design impractical.

As shown in the above table, a large core diameter is favorable, especially since it is not of critical importance to maximize the small-signal gain of the amplifier. There is a limit to how large the core can be made, however. If the core is made too large (V>2.4, with the "V-number" defined as: $V=(\pi d_{core}NA)/\lambda$, where $\lambda$ is the wavelength in free space) the fiber will no longer be constrained to operate on the lowest-order transverse mode (the $LP_{01}$ mode). In FIG. 1, the total number of $LP_{lm}$ modes (M) is plotted as a function of V. Included in the count are two helical polarities for each mode with l>0 and two polarization states per mode. The dashed curve is the relation $M=(4V^2/\pi^2)+2$, which provides an approximate formula for the number of modes when V>>1 (see *Fundamentals of Photonics*, B. E. A. Saleh and M. C. Teich, John Wiley & Sons, New York, N.Y. (1991)).

As shown in FIG. 1, with increasing cross-sectional area (V), the number of transverse modes in a multimode mode fiber increases very rapidly. Multimode fiber lasers are characterized by poor beam quality. Good beam quality is important in a number of applications: nonlinear frequency conversion, lidar, photolithography, pumping of optical parametric oscillators/amplifiers, and applications that require the output of the laser to be coupled into a single-mode fiber or focused to as small spot size as possible (e.g., materials processing).

Figure 2:
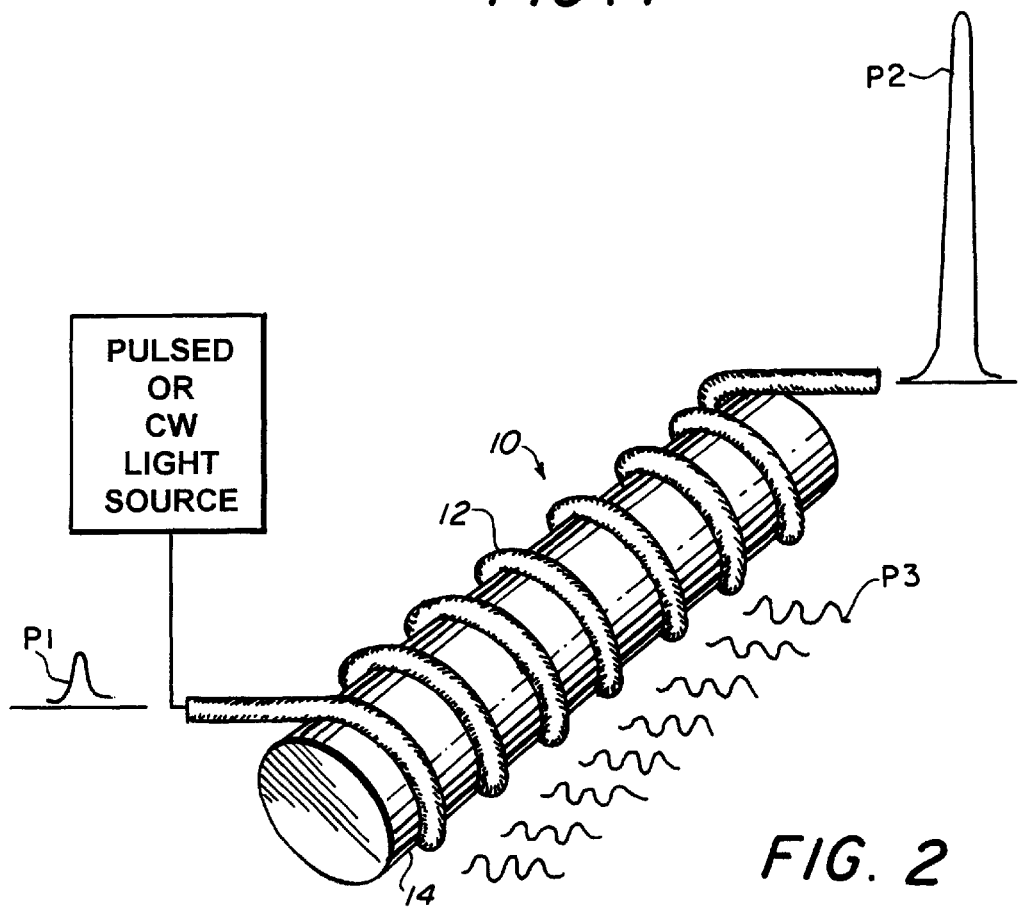
FIG. 2 is a schematic diagram of a preferred embodiment of the multimode fiber amplifier of the invention.
Figure 3:
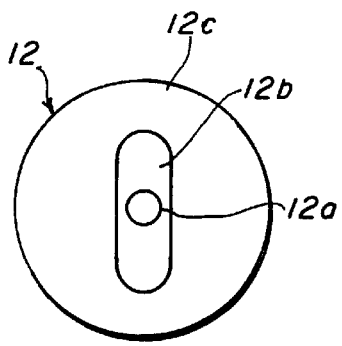
FIGS. 3 and 4 are, respectively, schematic transverse and longitudinal cross sectional views of a preferred embodiment of the optical fiber of FIG. 2.
Figure 4:
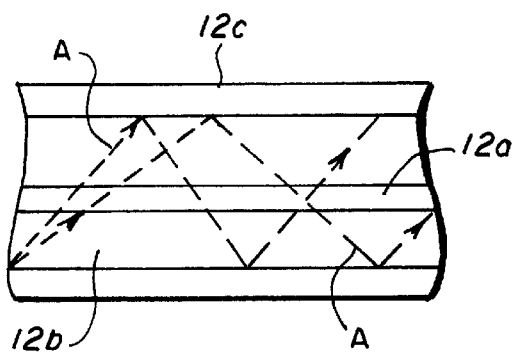

In the present invention a pulsed fiber source is constructed from a multimode fiber amplifier that is spatially filtered so that only the $LP_{01}$ mode experiences a significant amount of gain. In a preferred embodiment the "helical fiber amplifier" is configured from a multimode gain fiber wrapped around a cylindrical mandrel whose radius of curvature is chosen to introduce a small amount of bend loss for the lowest-order mode, as shown in FIG. 2 (which is a highly schematic perspective view, not to scale). The multimode fiber amplifier, which is generally denoted 10, comprises a multimode optical fiber 12 and cylindrical mandrel 14. A pulsed or continuous wave (cw) light source is indicated at 16. (The amplifier may also be operated as an ASE source by omission of 16, or as a laser.) Although the multimode optical fiber 12 may comprise either a doped or undoped core and either a single-clad or double-clad structure, a double-clad, rare-earth doped fiber with a large core diameter is advantageous, resulting in increased pulse energy and peak power handling capabilities, and scaling to higher average power. Such a double-clad structure is shown in FIGS. 3 and 4 wherein the fiber 12 includes a doped core 12a, inner cladding 12b of a large area and high NA and outer cladding 12c typically of a low-index polymer. The pump light is indicated in FIGS. 3 and 4 by arrows A. As indicated above, the multimode optical fiber 12 is wound into a coil, preferably around a mandrel such as the cylindrical mandrel 14, to improve beam quality by filtering out higher-order modes supported by the large core diameter of the fiber 12.

The cylindrical mandrel 14 is chosen to have a diameter such that the higher-order modes experience substantial bend loss compared to the fundamental mode when the fiber is wound onto the mandrel 14. The diameter of mandrel 14 determines the bend radius of the coil formed by the fiber 12. The fundamental ($LP_{01}$) mode exhibits the lowest sensitivity to bend loss, and for all modes the attenuation coefficient (dB/m) for bend loss depends exponentially on the radius of curvature (See *Optical Fiber Telecommunications*, Edited by S. E. Miller and A. G. Chynoweth, Academic Press, San Diego, Calif., 1979.), allowing bend loss to be used as a form of distributed spatial filtering. In FIG. 2, an input pulse is indicated at P1, an output pulse at P2 and the higher-order modes which suffer radiation loss at D3.

The mode-filtered amplifier is very lossy for higher-order modes while maintaining relatively low loss for the $LP_{01}$ mode. As with a conventional single-mode amplifier, the stored energy and peak-power-handling capability are optimized by making the core/cladding index difference as small as possible and the dopant concentration as large as possible. But by exploiting bend loss to discriminate against higher-order modes, the helical amplifier allows the fiber amplifier to be scaled up in size, no longer subject to the restriction V<2.4.

As described earlier, when $d_{core}$ is made larger at constant $\Delta$, the MFD increases proportionally. Starting with a conventional single-mode fiber amplifier, consider the effect making $d_{core}$ larger by a factor of 5. The MFD of the $LP_{01}$ mode is increased by roughly a factor of 5, and as a result the threshold for nonlinear processes is ~25 times that of the conventional single-mode amplifier. The small-signal gain is unchanged because even though there now 25 times as many dopant atoms per unit length of fiber contributing to ASE, the NA of the $LP_{01}$ mode (which should be distinguished from the effective NA for a multimode fiber, $NA_{eff}$, which is simply a measure of the equivalent solid angle for light collection by all the of LP modes supported) is a factor of 5 lower, which means that the fraction of spontaneous emission that is within the capture angle of the fiber has been reduced by a factor of 25. On the basis of these considerations it is apparent that the energy storage is improved by a factor of 25 as well. (Note that even for applications where beam quality is not important, the helical fiber amplifier achieves much higher energy storage and small-signal gain than a conventional multimode amplifier because ASE is generated only in the lowest-order mode.)

Figure 5:
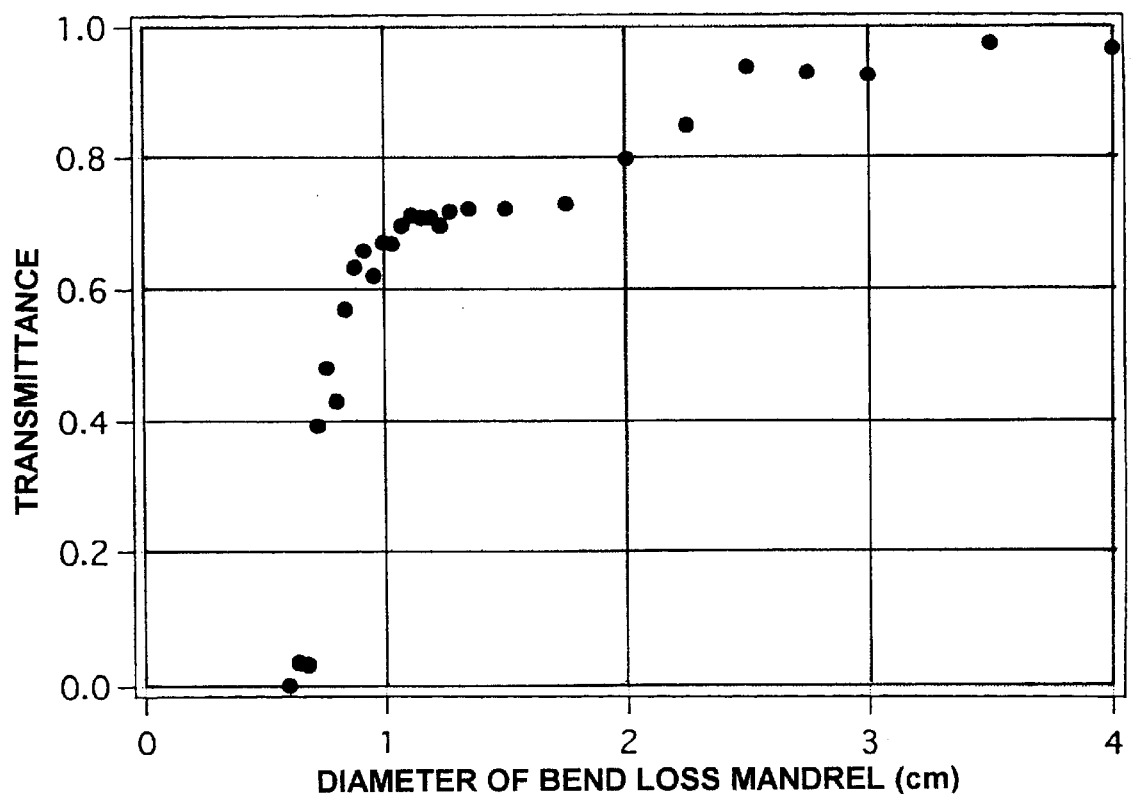
FIG. 5 is a graph showing the mode-filtering effect as a function of mandrel diameter for a particular fiber.

The spatial filtering effect that is the basis of the helical fiber amplifier is illustrated by the data plotted in FIG. 5. In this experiment, the pigtail of a single-mode, fiber-coupled, 1550 nm, diode laser was spliced to a length of multimode fiber (undoped). The multimode fiber had a core diameter of 25 μm and an $NA_{eff}$ of 0.14 (V=7.1 at 1550 nm). A 50 cm long section of the fiber sample was wrapped around a cylindrical mandrel and the transmitted power was measured at several different radii of curvature.

At 1550 nm, this multimode fiber is capable of supporting the $LP_{01}$, $LP_{11}$, $LP_{21}$, $LP_{02}$, $LP_{31}$, $LP_{12}$, and $LP_{41}$ modes. The $LP_{11}$ mode is the most difficult of the higher-order modes to discriminate against since other than the $LP_{01}$ mode, it is the least susceptible to bend loss. Consequently, if the radius of curvature is made small enough to filter out the $LP_{11}$ mode, we can be assured that all of the higher-order modes are filtered out as well. The data in FIG. 5 show that at a bend diameter of ~1.5 cm, all of the signal propagating in the higher-order modes is extinguished by bend loss, while the power in the $LP_{01}$ mode suffers negligible attenuation. In fact there is an extensive "plateau region" in FIG. 5—a range of bend radii over which the fundamental mode is transmitted without loss while the second-lowest-order mode ($LP_{11}$) is filtered out.

Inspection of FIG. 5 also indicates that more than 70% of the power injected into the multimode fiber was coupled into the lowest-order mode, with about 20% coupled into $LP_{11}$ and less than 10% distributed among the remaining higher-order modes. As with a conventional single-mode fiber amplifier, the launch conditions (focused spot size, alignment, and beam quality) will determine what fraction of power from a free space beam injected into the helical fiber amplifier results in excitation of the $LP_{01}$ mode.

One potential area of concern is mode conversion--the tendency of light in a particular mode to be redistributed into an equilibrium distribution of modes as it propagates down a multimode fiber. In a perfectly constructed waveguide, there is no exchange of power between the different modes; the modal distribution established by initial launch conditions is time invariant. In real fibers, however, mode conversion arises due to imperfections in the structure of the waveguide. Power propagating in $LP_{01}$, for example, will to some extent cause excitation of higher modes. Fortunately, in a typical fiber this exchange of power between different modes is a relatively slow process. For example, when the bend loss experiment described above was repeated with a second mandrel of the same diameter placed a few meters downstream of the first mandrel, no additional filtering effect was observed. If after passing through the first bend loss filter, the light propagating in the $LP_0$ mode had suffered significant mode conversion, a drop in transmitted power would have been observed when the second bend loss filter was put in place.

Figure 6:
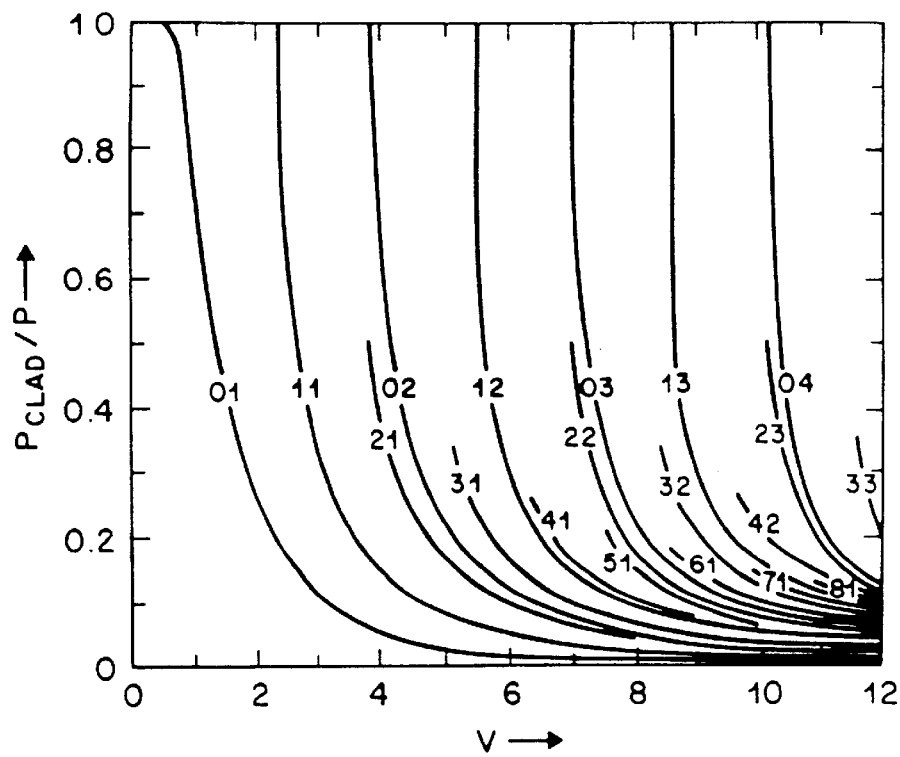
FIG. 6 is a graph showing the ratio of power carried in the fiber cladding to the total power carried by the first several $LP_{lm}$ modes as a function of V.

Optimization of the Helical Fiber Amplifier: The helical fiber amplifier of the invention allows the core diameter to be scaled up in size by lifting restriction V>2.4. There is, however, a limit to how large the core diameter can be made. Qualitatively, this limit can be understood in terms of the mechanism responsible for bend loss. When a fiber is bent, the phase fronts of the modal field are pivoted about the center of curvature of the bend. There is a critical distance on the side opposite the center of curvature where the velocity of the phase fronts approach the speed of light in the cladding. In this outer portion of the fiber the modal field is subject to radiation loss, an effect that becomes more pronounced as the radius of curvature is decreased, since a larger portion of the modal field will be radiative. In FIG. 6 the fraction of power contained in the cladding is plotted as a function of V for each of the LP modes. For V>2.4, where more than one mode is supported, the $LP_{01}$ mode contains less power in the cladding than any of the higher-order modes. It is therefore subject to less bend loss (compare, for instance, the $LP_{01}$ and $LP_{11}$ modes). But as shown in FIG. 6, this distinction becomes less pronounced as V is made larger. Referring back to FIG. 5, it is anticipated that the plateau region will be compressed as the V-number (core diameter at a given value of $\Delta$) is made larger. With increasing V, the amount of discrimination between $LP_{01}$ and $LP_{11}$ will eventually decrease to the point that the amplifier supports more than one mode.

The curvature loss equations for a step-index fiber described by Marcuse will be used to carry out a quantitative analysis of this effect. (See D. Marcuse, "Field deformation and loss caused by curvature in optical fibers" J. Opt. Soc. Am., Vol. 66, No. 4, pg. 311, (1976)) The input parameters for this analysis are:

1) the wavelength of operation
2) the NA of the fiber (or equivalently, the core/cladding index difference)
3) the core size of the fiber (or equivalently, the V-number)
4) the amount of bend loss that is acceptable for the lowest-order mode The output parameters are:

1) attenuation of the $LP_{11}$ mode relative to the $LP_{01}$ mode
2) radius of curvature for which $LP_{01}$ loss=1 dB (approximate size of required bend loss mandrel)

These calculations have been carried out for λ=1064 nm (appropriate for a Nd- or Yb-doped fiber amplifier), and $NA_{eff}$=0.08 (a typical value for a low NA fiber).

Figure 7:
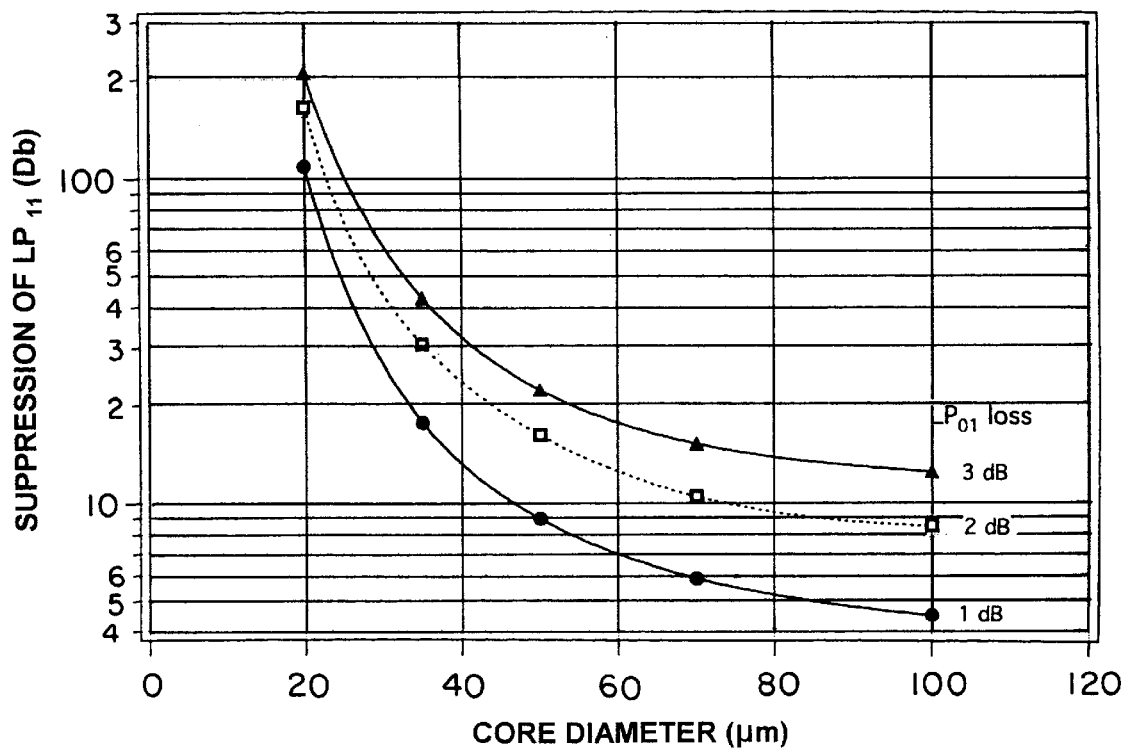
FIG. 7 is a graph showing the calculated suppression of the $LP_{11}$ mode relative to $LP_{01}$ bend loss as a function of fiber core diameter, for a step-index fiber.

The main results of this analysis are summarized in FIG. 7, which is a graph of the suppression of the $LP_{11}$ mode (relative to the $LP_{01}$ mode) vs. $d_{core}$ (λ=1064 nm, $NA_{eff}$= 0.08, and length of fiber coil=1 m). Note the decrease in mode discrimination as $d_{core}$ is made larger. The family of three curves in FIG. 7 demonstrate the tradeoff between bend loss for the $LP_{01}$ mode and suppression of $LP_{11}$. It should be emphasized that the annotations in FIG. 7 denote bend loss for the $LP_{01}$ mode integrated over the entire length of the fiber. The curve labeled "3 dB", for instance, refers to a helical amplifier in which the radius of curvature is chosen so that 3 dB (50%) of the power injected into one end of the fiber in the $LP_{01}$ mode is dissipated by bend loss as it traverses the length of the amplifier. This amount of bend loss does not imply that the energy extracted from the gain medium is reduced by a factor of two. The energy extraction efficiency would be much greater than 50% because most of the photons generated in the amplification process do not travel the entire length of the amplifier. For a uniformly pumped fiber, coiled to produce a $LP_{01}$ bend loss of 3 dB, an energy extraction efficiency of 80% is calculated. In practice, an even higher energy extraction efficiency could be obtained by using a counter-propagating pump configuration (in which case the fiber would not be uniformly pumped).

The calculation shown in FIG. 7 provides a conservative estimate of $LP_{11}$ suppression, for two additional reasons. This analysis neglects the effect of field deformation caused by fiber curvature, which decreases the $LP_{01}$ loss relative to the attenuation coefficients of the higher-order modes. Additional suppression of $LP_{11}$ relative to $LP_{01}$ is provided by the spatial overlap of the mode-field distributions with the gain region (particularly at lower V-numbers).

In most applications, 10 dB of $LP_{11}$ suppression is likely to be adequate. Referring back to FIG. 7, it should therefore be possible to make the core size as large as 50 to 100 $\mu$m. This value should be compared to the dimensions of a single-mode fiber with $\lambda$=1064 nm and NA=0.08: $d_{core}$=9 $\mu$m. Even if the more conservative value of $d_{core}$=50 $\mu$m is adopted, the stored energy and peak-power-handling capability of the helical fiber amplifier are a factor of 30 greater than the conventional single-mode amplifier.

Figure 8:
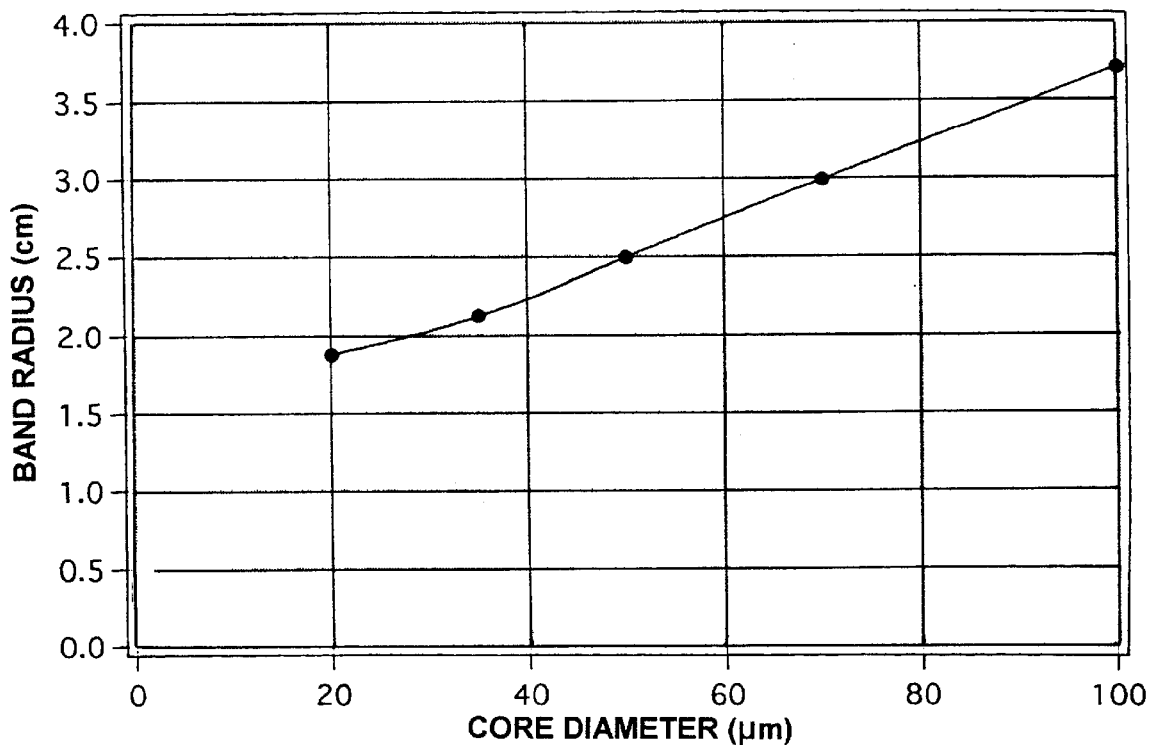
FIG. 8 is a graph showing the mandrel radius calculated to provide 1 dB bend loss in the $LP_{01}$ mode, for a 1 meter length of fiber, as a function of core diameter, for step-index fiber.

FIG. 8 shows the radius of curvature required to obtain 1 dB of bend loss in the $LP_{01}$ mode as a function of core diameter ($\lambda$=1064 nm, $NA_{eff}$=0.08 and length of fiber coil=1 m). This is the approximate radius of the bend loss mandrel for the helical amplifier, which would likely take the form of spool (rather than the cylindrical rod shown in FIG. 2). Its size is compatible with compact, lightweight construction.

It may also prove advantageous to use a bend loss mandrel of non-constant radius of curvature to improve $LP_{11}$ suppression and energy extraction efficiency. For example, to minimize excitation of higher-order modes, the input end of the helical fiber amplifier could incorporate a short stretch of fiber that is wound at a smaller radius of curvature than the remainder of the amplifier. The energy extraction efficiency would be reduced for this short section of the fiber, but since the signal undergoing amplification is at low power in the initial portion of the amplifier, the total energy loss would be small in absolute terms.

For applications in which the amplifier is required to preserve the polarization of the signal being amplified (or maintain linear polarization), the helical fiber amplifier can be fabricated from polarization preserving gain fiber. Alternatively, non-polarization preserving gain fiber can be used in conjunction with a Faraday mirror and polarizing beam splitter in a double-pass configuration, a technique that has been used extensively with conventional single-mode fiber amplifiers. (See I. N. Duling, R. D. Esman, Electron. Lett., Vol. 28, No. 12, pg. 1126 (1992)). In another embodiment non-polarization preserving gain fiber is used to construct the helical fiber amplifier, and stress-induced birefringence is utilized to make the gain fiber polarization preserving. The stress-induced birefringence results from bending the fiber, and can be augmented by applying tension while wrapping the fiber around the cylindrical mandrel. (See S. C. Rashleigh, R. Ulrich, Opt. Lett., Vol. 5, No. 8, pg. 354 (1980)).

Pumping of the Helical Fiber Amplifier: For any fiber amplifier, the range of options available for pumping is an essential design consideration. In nearly every application one or more of the following factors is important:

1) maximum pump power available
2) cost of pump diode(s) and coupling optics
3) efficiency with which pump power can be transferred to doped core
4) length of fiber required to absorb pump power
5) extent to which pump diode coupling optics interfere with or complicate system design
6) deterioration of pumping efficiency over time due to misalignment of coupling optics The helical fiber amplifier can be configured in either a core-pumped (single-clad) or cladding-pumped (double-clad) geometry. In the core-pumped configuration, pump light from a single-mode pump diode is coupled into the end of the fiber and absorbed as it propagates down the core. Unfortunately, single-mode pump sources are very expensive and provide relatively low pump power (e.g., $3000 for a 100 mW device). If possible, it is preferable to use a double-clad fiber geometry. (See E. Snitzer, H. Po, F. Hakimi, R. Tumminelli, B. C. McCollum, "Double-clad, offset core Nd fibre laser", Dig. Conf. on Optical Fibre Sensors, 1988, Paper PD5.) As shown in FIGS. 3 and 4, in a double-clad fiber the pump light is contained within a large cross sectional area, high NA, multimode cladding that surrounds the core of the fiber. The interaction of the pump light and the doped core is therefore greatly reduced in comparison to the core-pumped geometry. Nonetheless, for a number of rare-earth dopants (most notably Yb, Nd, and Er/Yb) the pump absorption coefficient can still be made large enough to allow the cladding-pumped configuration to be used.

The advantage of using double-clad fiber is that low-brightness, broad-area, laser diodes can be efficiently coupled into the inner cladding. These broad-area devices offer much higher power (several watts) at much lower cost (~$200 per watt of pump power) than single-mode pump diodes. In addition, the alignment of the optics used to couple pump light into the double-clad fiber is much less sensitive to misalignment by mechanical disturbances or fluctuations in ambient temperature.

Figure 9:
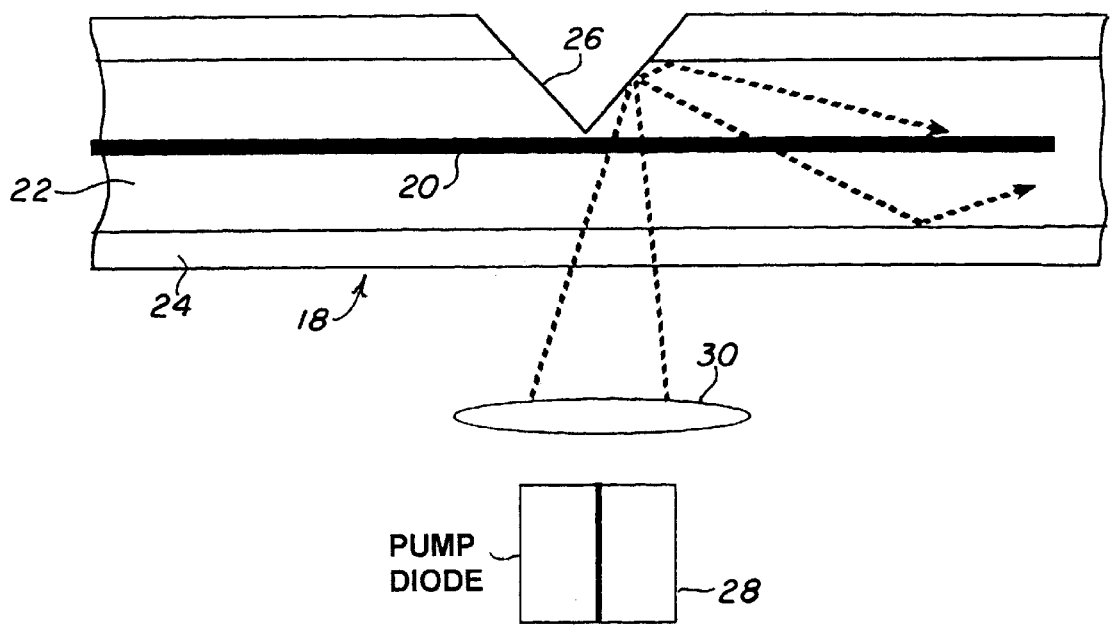
FIG. 9 is a schematic side elevational view of one preferred pumping scheme for the fiber amplifier of the invention.

The present invention is compatible with all known methods for pumping double-clad fibers. One method that is especially well suited to high average power is the side-pumping technique shown in FIG. 9 wherein a fiber 18 includes a doped core 20, inner cladding 22, and outer cladding 24, and v-groove 26 is provided in fiber 18, as shown. A light beam from a pump diode 28 is launched through a microlens 30 into fiber 18.

It is clear from the discussion thus far that the preferred embodiment of the helical fiber amplifier will include the following characteristics:

1) as high a dopant concentration as possible
2) as low a core/cladding index difference as possible
3) a multimode core with a diameter that is likely to be at least 50 $\mu$m
4) a double-clad geometry and allow for dramatic improvements in the energy storage and peak- and average-power handling capability of fiber amplifiers. The other key advantage provided by the helical fiber amplifier design is a significant improvement in available pump power and/or pumping efficiency compared to conventional double-clad fiber sources.

Consider for example a conventional double-clad fiber in which the ratio of cross sectional areas between the inner cladding (in which the pump light is confined) and the core (in which the pump light is absorbed) is typically 300:1. If as discussed earlier the core diameter is increased from 9 $\mu$m (single-mode core, $\lambda$=1064 nm, NA=0.08) to 50 $\mu$m, the ratio of cross-sectional areas is reduced to 10:1. The pump absorption coefficient is therefore improved by a factor of 30. This makes it possible to 1) increase the fraction of pump light that is absorbed in the core, 2) loosen the wavelength tolerance of the pump diodes used to excite a narrow absorption feature, and/or 3) use a shorter length of fiber. As mentioned earlier, a shorter length of fiber is advantageous for suppression of nonlinear processes. In addition it can provide significant reductions in cost. Alternatively, if the inner cladding is scaled up by the same amount as the core diameter, the ratio of cross-sectional areas remains 300:1, but the much larger inner cladding makes it possible to use very large area pump diodes that supply 10 W of power or more at a cost of only ~$200/W.

In summary, the present invention provides a number of important performance enhancements for rare-earth doped fiber lasers:

large increase in energy storage
large increase in peak power handling capability
scaling to high average power
more efficient pumping As a result the helical fiber amplifier should find use in a wide variety of applications.

Figure 10:
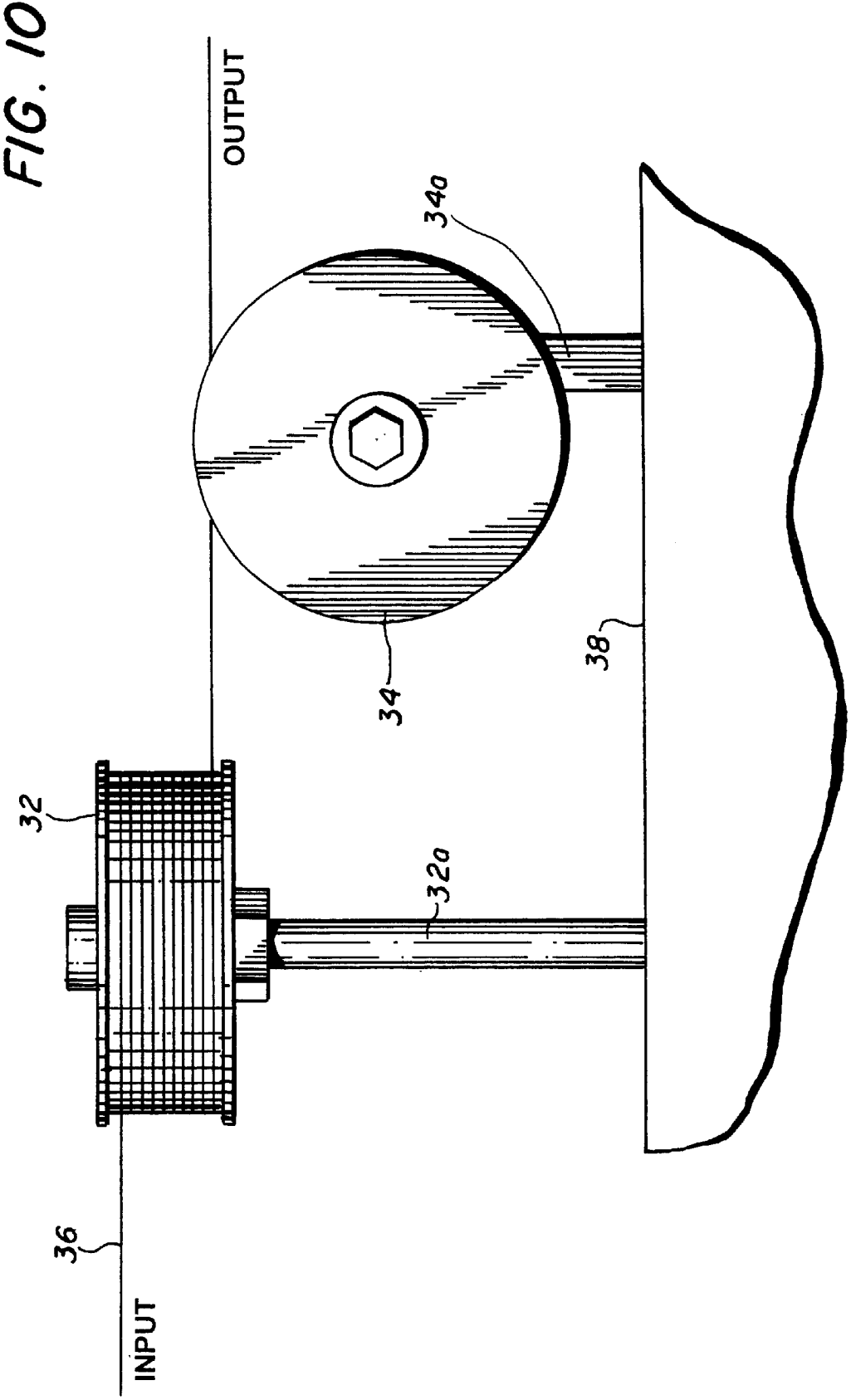
FIG. 10 is a side elevational view of an experimental apparatus (constructed using undoped fiber) incorporating the basic features of a further preferred embodiment of the invention.

Experiments with Undoped Multimode Fiber. The distributed spatial filtering effect that is the basis of the helical fiber amplifier has been demonstrated using an undoped multimode fiber capable of supporting ~100 transverse modes. A schematic diagram of the experimental arrangement is shown in FIG. 10. In this experiment a pair of horizontal/vertical spools 32 and 34, rather than a single bend loss mandrel as shown in FIG. 2, was used for spatial filtering. Spools 32 and 34 support a multimode fiber 36 and, in turn, are supported by support posts 32a and 34a on a support surface 38. For the sake of clarity, further discussion of FIG. 10 will be deferred until the remainder of the experiment has been described in full.

At the end of the multimode fiber labeled "input" in FIG. 10, the free-space beam from a 200 mW cw Nd:YAG laser (1064 nm) was coupled into the fiber 36 using a conventional bulk lens (not shown). The focusing conditions were roughly optimized for excitation of the $LP_{01}$ mode. The diameter of the bend loss spools (81 mm) 32 and 34 was chosen to provide a 3 dB bend loss for the $LP_{01}$ mode. The beam emitted from the "output" end of the multimode fiber 36 was characterized using a photodiode (to measure transmitted power) and a linear ccd array (to measure the far-field intensity distribution, for the purpose of assessing beam quality).

Figure 11:
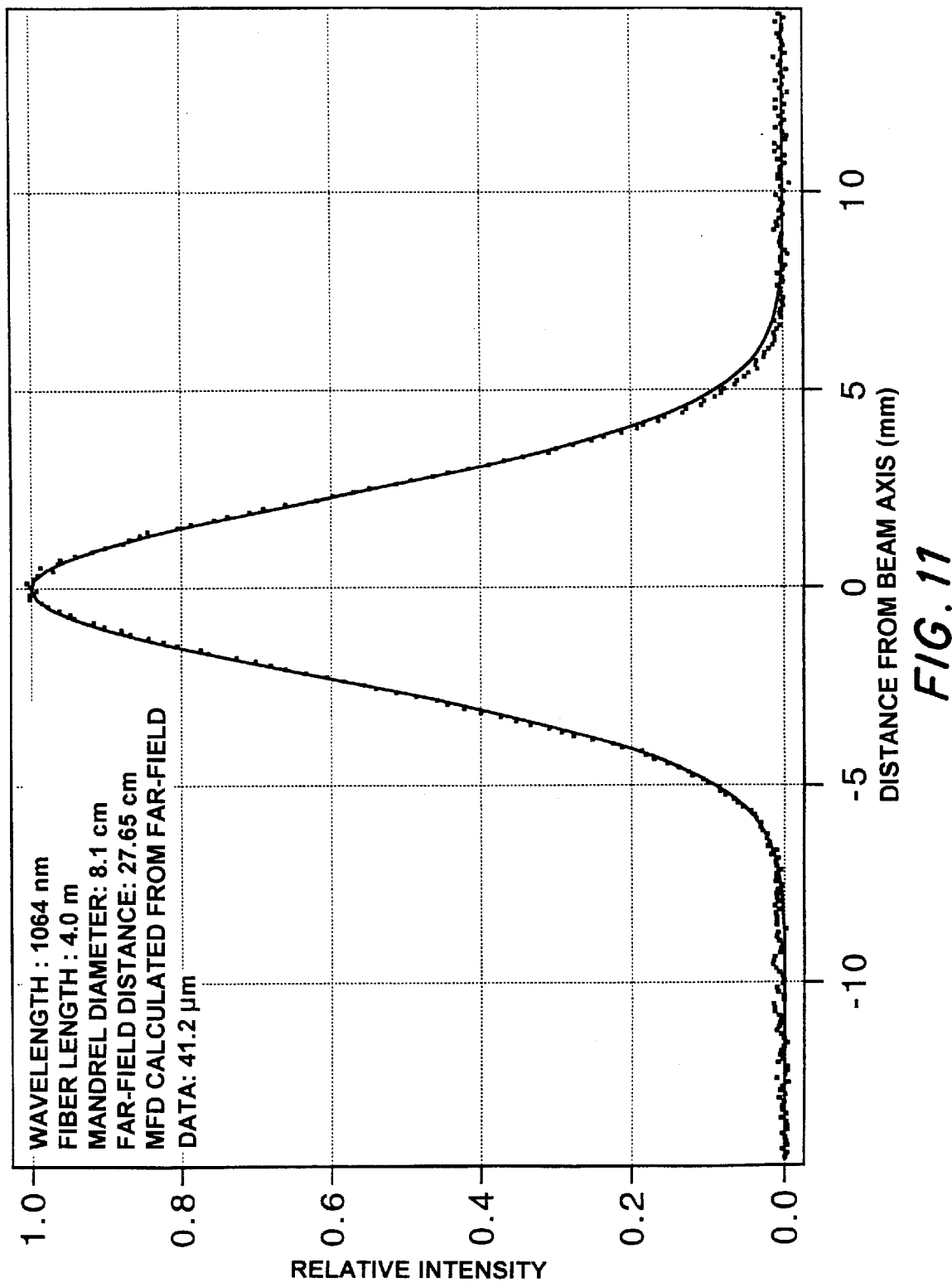
FIG. 11 is a graph showing a Gaussian fit to the far-field beam profile produced by the multimode fiber apparatus of FIG. 10.

The data recorded by the ccd array are plotted in FIG. 11. The solid line in this plot is a Gaussian fit to the raw data. This experiment demonstrates unambiguously that: 1) the spatial filtering provided by the bend loss mandrels allows the highly multimode fiber to function as a single-mode waveguide, 2) exchange of power between the $LP_{01}$ mode and higher-order modes does not interfere significantly with the spatial filtering process, and 3) the signal propagating through the fiber can be thoroughly filtered without introducing unacceptably high bend loss for the lowest-order mode.

The MFD of the $LP_{01}$ mode (41.2 $\mu$m) was calculated from the far-field intensity distribution of the Gaussian beam. The MFD for a typical low-NA (NA=0.08) single-mode fiber at 1064 nm is 9.2 $\mu$m. The factor of 20 increase in mode-field area achieved with the coiled multimode fiber corresponds to a factor of 20 increase in peak- and average-power handling capability—and if fabricated as a rare-earth doped fiber—a factor of 20 increase in energy storage (both of these parameters scale as $MFD^2$). As discussed above, such an amplifier would also provide dramatic improvements in pumping efficiency and/or average pump power when configured as a double-clad fiber. It should be emphasized that since a diffraction-limited Gaussian beam was obtained in this experiment, it is likely that in an optimized version of the helical fiber amplifier an increase in mode-field area significantly greater than the factor of 20 demonstrated here will be realized.

The purpose of winding the multimode fiber on the two spools 32 and 34 (of equal diameter), one oriented horizontally and the other vertically, is to address a specific issue. When the multimode fiber is wound on a single spool, the bend loss experienced by the two helical polarities of the $LP_{11}$ mode is unequal. Bend loss occurs preferentially on the side of the fiber that is opposite the center of curvature. For one helical polarity the mode field is at a maximum in the portion of the fiber subject to radiation loss, while the same location corresponds to a node in the intensity distribution of the other helical polarity.

To obtain adequate attenuation for both helical polarities of the $LP_{11}$ mode one might consider simply decreasing the diameter of the bend loss spool. The drawback of this approach is that bend loss for the $LP_{01}$ mode is increased. A better solution is to wrap the fiber in such a way that the + and − helical polarities of the $LP_{11}$ mode are subject to comparable attenuation, which results in the minimum amount of bend loss for the $LP_{01}$ mode. The simplest implementation of this approach is shown in FIG. 10, where half of the fiber is wound on the horizontal spool and the other half is wound on the vertical spool (although a number of other geometries are possible). Similar considerations apply to filtering of higher-order modes, although to a much lesser extent.

Figure 12:
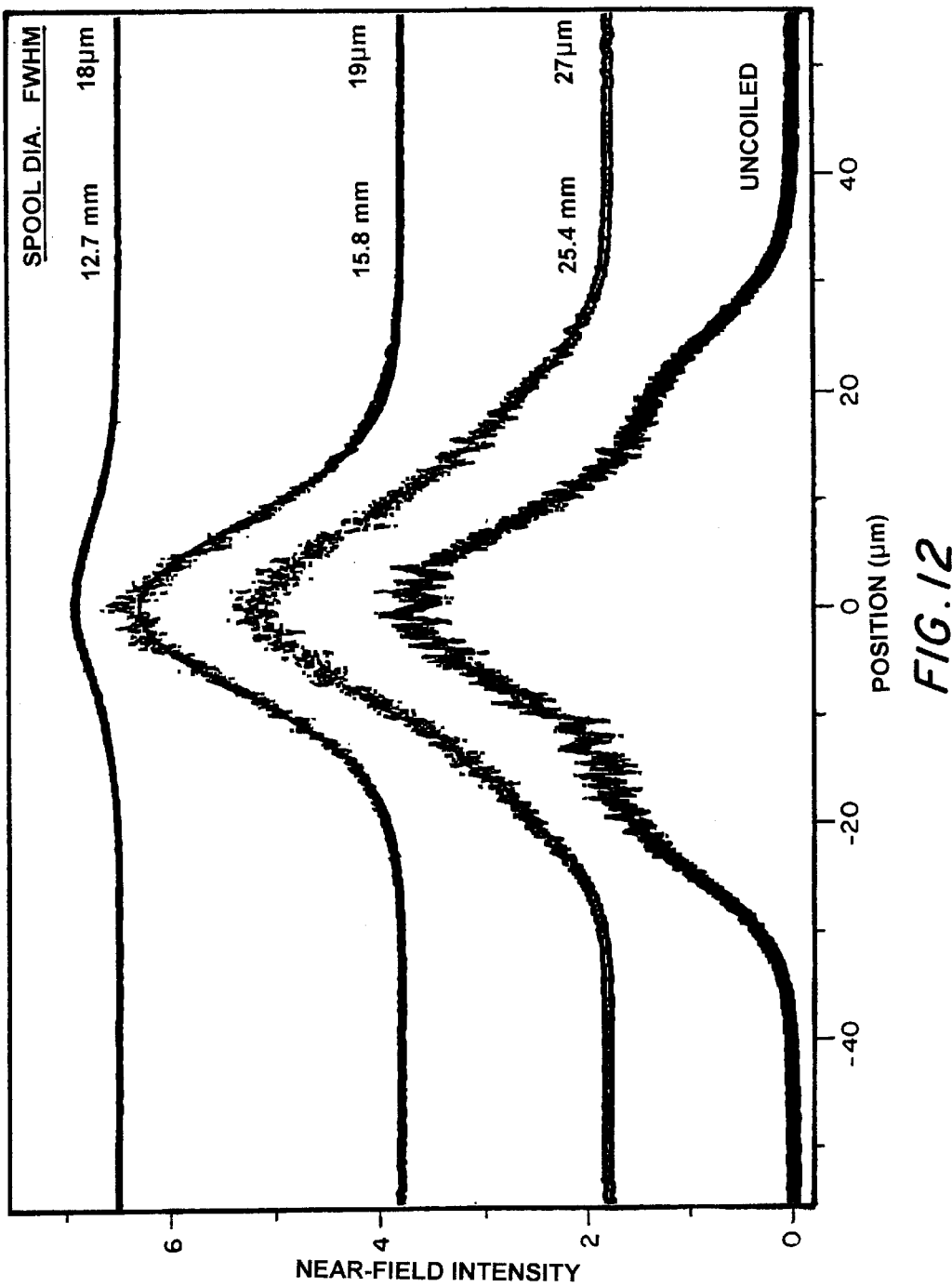
FIG. 12 is a graph showing measurements of the rear-field spatial profile made for a mode-filtered Yb-doped amplifier.

Experiments with Mode-filtered, Yb-doped Fiber Amplifier: Other experiments have been carried out using a Yb-doped multimode amplifier, for which the gain fiber had the following specifications:

core diameter: 25 $\mu$m
cladding diameter: 200 $\mu$m, hexagonal
fiber V-number: 7 to 8 (25 to 30 modes supported)
rare-earth dopant: Yb, 1.5% by weight
length of fiber used: 5 meters
coil diameter for mode filtering: 15.8 mm The data shown in FIG. 12 were recorded by imaging the near-field beam profile of the multimode amplifier onto a linear ccd array. The four traces in FIG. 12 show the effects of:

a) no mode filtering (uncoiled fiber)
b) under-filtering ($d_{coil}$=25.4 mm)
c) optimal, or near optimal, filtering ($d_{coil}$=15.8 mm)
d) over-filtering ($d_{coil}$=12.7 mm).

With no mode filtering poor beam quality is obtained from the multimode amplifier; the near-field profile shows contributions from many different higher-order modes. When the diameter of the bend radius is roughly optimized, a diffraction-limited Gaussian beam is observed (quantitative measurements are given in FIG. 13). If the diameter of the bend loss mandrel is too small, the output is a clean Gaussian beam but the bend loss for the $LP_{01}$ mode is unnecessarily large (overfiltering).

Figure 13:
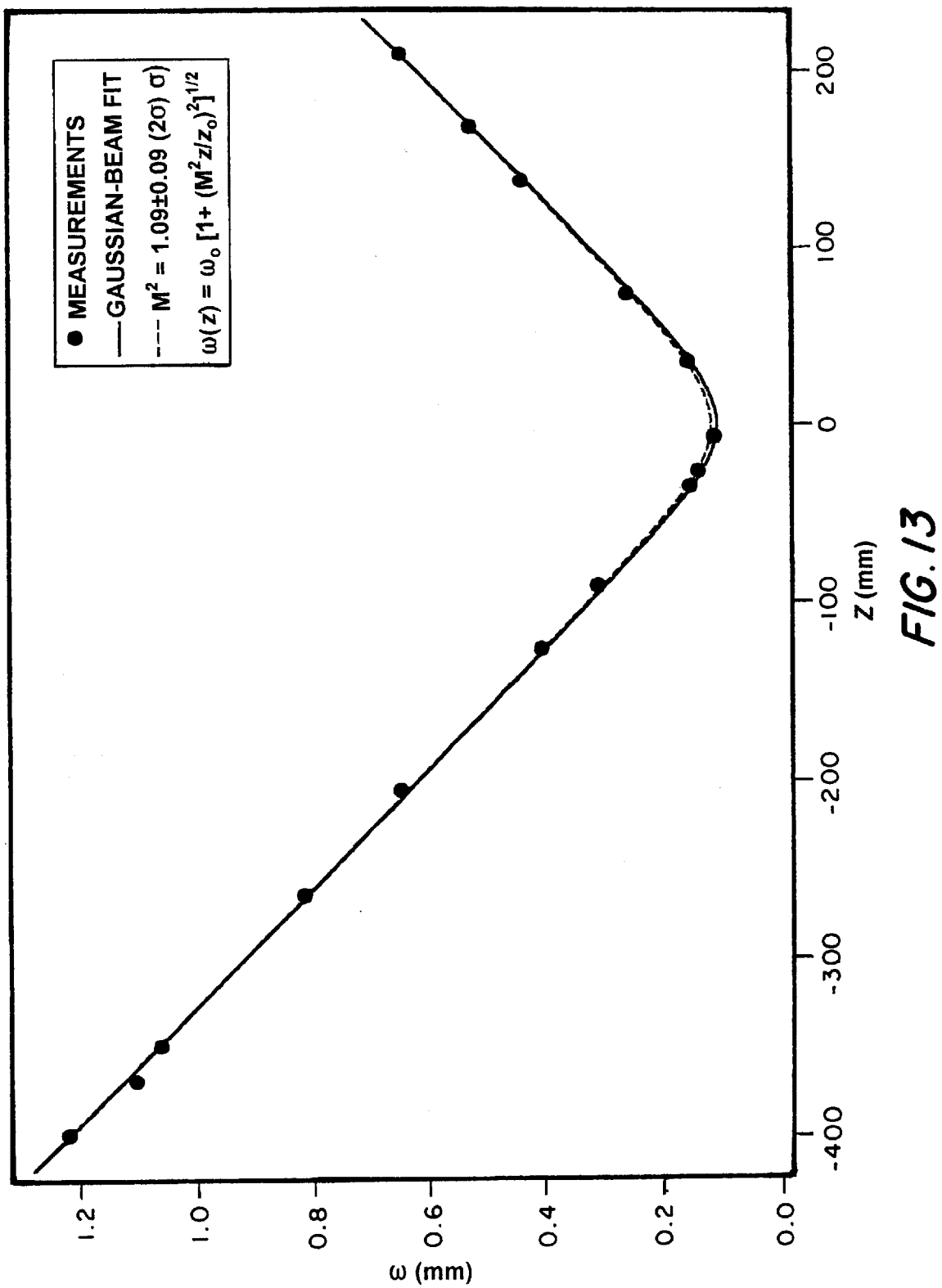
FIG. 13 is a graph plotting ω (beam radius) as a function of z (distance from beam waist) for a mode-filtered Yb-doped ASE source, from which $M^2$ is determined.
Figure 14:
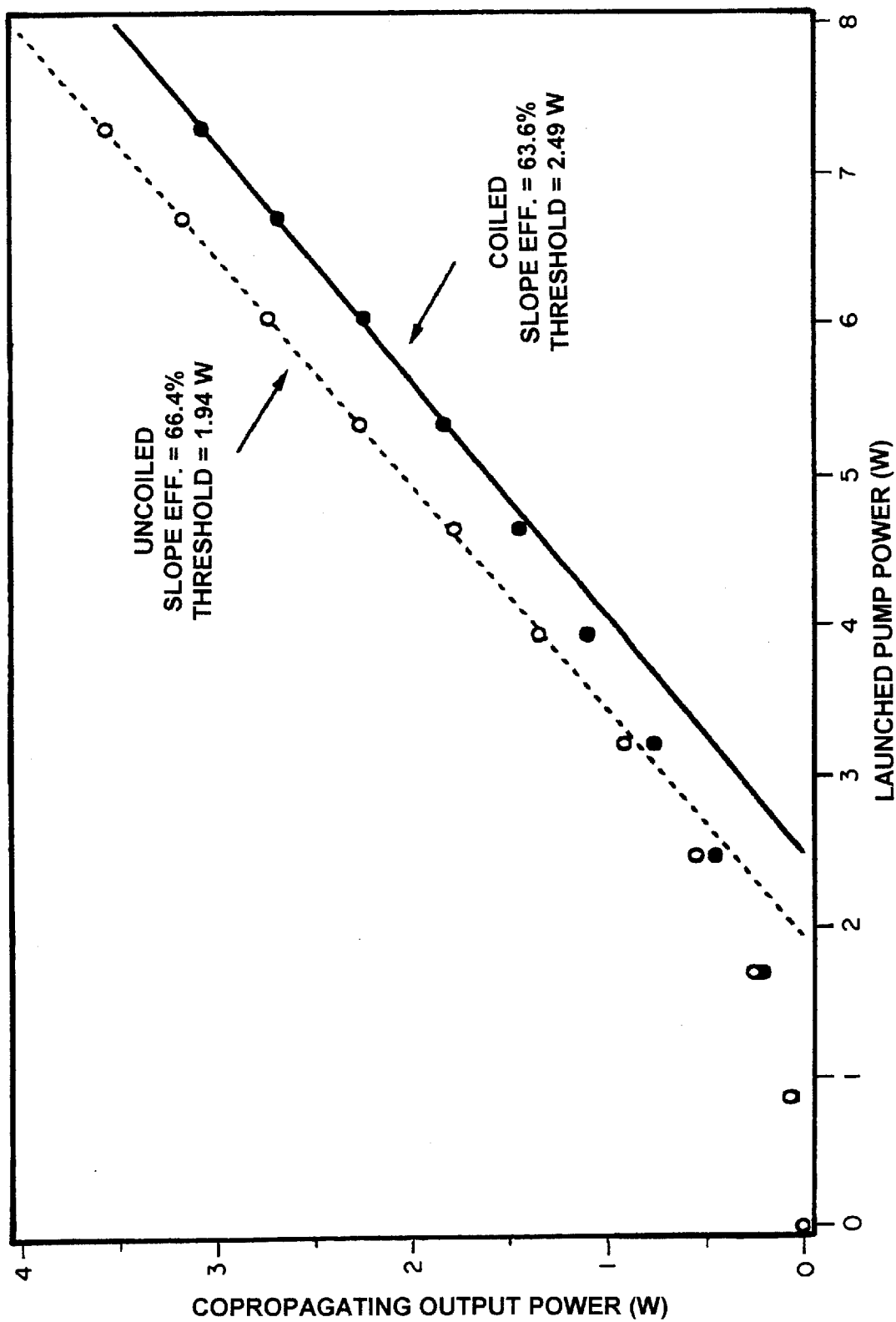
FIG. 14 is a graph plotting coproprogating output power as a function of launched pump power, for both an uncoiled and a coiled (mode filtered) Yb-doped fiber amplifier, from which amplifier slope efficiency is determined.

FIG. 13 shows in quantitative terms that the beam quality of the helical amplifier is diffraction-limited ($M^2$=1.09±0.09, 2σ (uncertainty). In addition, the slope efficiency data plotted in FIG. 14 show that the helical amplifier does not suffer from significant bend loss in the lowest-order mode. These experiments used a two-mandrel arrangement similar to that of FIG. 10. The dimensions of the two mandrels are compatible with a compact, lightweight amplifier package.

The mode filtering calculations described above in connection with FIG. 7 indicate that it should be possible to use a multimode fiber with core size well in excess of 25 µm. Furthermore, it should be emphasized that the data shown in FIGS. 13 and 14 constitute a stringent test of the use of bend loss for constructing a mode-filtered amplifier, for the following reasons:

a) Spontaneous emission uniformly excites all modes of the fiber. In many applications, the cavity configuration or launch condition of the seed beam can provide further suppression of high-order modes.

b) Further discrimination of $LP_{01}$ vs. $LP_{11}$ can be obtained by doping only the central portion of the core to maximize the ratio of the $LP_{01}/LP_{11}$ core overlap integrals. A further benefit of this approach is that the pump power requirements for the amplifier are lowered. The gain per unit length of the fiber amplifier (important in certain applications) is degraded, however.

Although the invention has been described above in relation to preferred embodiments thereof, it will be understood by those skilled in the art that variations and modifications can be effected in these preferred embodiments without departing from the scope and spirit of the invention.

What is claimed is:

1. A multimode fiber amplifier system providing discrimination between a fundamental mode and undesired higher-order modes, said amplifier system comprising:
   a light source for producing a light beam, and
   a linear multimode fiber amplifier for receiving said light beam and comprising a multimode doped optical fiber having a V-number equal to or higher than 4 with respect to an input signal, capable of supporting a fundamental mode and higher-order modes, having a radius of curvature such that the higher-order modes of said input signal experience substantially increased bend losses as compared with the fundamental mode of said input signal.

2. An amplifier system according to claim 1 wherein said fiber comprises a coiled fiber.

3. An amplifier system according to claim 2 wherein said coiled fiber has a constant radius of curvature.

4. An amplifier system according to claim 2 wherein said coiled fiber has a non-constant radius of curvature.

5. An amplifier system according to claim 1 wherein said light source comprises a continuous wave light source.

6. An amplifier system according to claim 1 wherein said light source comprises a pulsed light source.

7. An amplifier system according to claim 1 wherein said multimode optical fiber comprises a double-cladding structure.

8. An amplifier system according to claim 1 wherein said multimode optical fiber comprises a core having a diameter of between 3 microns and 100 microns.

9. An amplifier system according to claim 1, further comprising a first mandrel and a second mandrel, wherein said first mandrel has a vertically extending longitudinal axis and second mandrel has a horizontally extending longitudinal axis, and wherein said multimode optical fiber is wound respectively onto each of said first and second mandrels.

10. An amplifier system according to claim 1 wherein said multimode fiber amplifier has an $M^2$ value less than 1.2, where $M^2$=1 denotes diffraction-limited beam quality.

11. An amplifier system according to claim 1 wherein the fiber amplifier is side pumped.

12. A linear multimode fiber amplifier comprising:
    a cylindrical support member, and
    a doped multimode optical fiber having a V-number equal to or higher than 4 with respect to an input signal, capable of supporting a fundamental mode and a plurality of higher-order modes, said fiber being wound onto said support with a radius such that said higher-order modes of said input signal experience substantially increased bend loss as compared with the fundamental mode of said input signal.

13. An amplifier system according to claim 12 wherein said wound fiber has a constant radius of curvature.

14. An amplifier system according to claim 12 wherein said wound fiber has a non-constant radius of curvature.

15. A multimode fiber amplifier according to claim 12 wherein said multimode optical fiber comprises a double-cladding structure.

16. A multimode fiber amplifier according to claim 12 wherein said multimode optical fiber comprises a core having a diameter of between 3 µm and 100 µm.

17. A multimode fiber amplifier according to claim 12 wherein said multimode fiber amplifier has an $M^2$ value less than 1.2, where $M^2$=1 denotes diffraction-limited beam quality.

18. A multimode fiber amplifier according to claim 12 further comprising a second cylindrical support member having a diameter about equal to that of the first-mentioned cylindrical support member, and said second support member having a longitudinal axis extending perpendicular to that of said first support member, and wherein a portion of said fiber is wound onto said second support member.

19. An amplifier system as in claim 12, wherein each of said first and second mandrels is of a comparable radius and wherein a length of fiber wound onto each said mandrel is comparable.

20. An amplifier system as in claim 12, further comprising a seed beam having a controlled launch condition for preferential excitation of the fundamental mode.

\* \* \* \* \*